(12) United States Patent
Monclus et al.

(10) Patent No.: US 9,395,960 B2
(45) Date of Patent: Jul. 19, 2016

(54) METHOD AND SYSTEM FOR DATA PLANE ABSTRACTION TO ENABLE A DYNAMIC CREATION OF NETWORK APPLICATIONS

(71) Applicant: PLUMgrid, Inc., Sunnyvale, CA (US)

(72) Inventors: Pere Monclus, San Jose, CA (US); Sushil Singh, Mountain View, CA (US); Brenden Blanco, Fremont, CA (US); Alexei Starovoitov, Los Gatos, CA (US); Awais Nemat, San Jose, CA (US)

(73) Assignee: PLUMGRID, INC., Sunnyvale, CA (US)

( * ) Notice: Subject to any disclaimer, the term of this patent is extended or adjusted under 35 U.S.C. 154(b) by 313 days.

(21) Appl. No.: 13/771,026

(22) Filed: Feb. 19, 2013

(65) Prior Publication Data

US 2014/0237456 A1    Aug. 21, 2014

(51) Int. Cl.
*G06F 9/45*     (2006.01)
*H04L 29/08*    (2006.01)

(52) U.S. Cl.
CPC . *G06F 8/41* (2013.01); *H04L 67/10* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 6,578,020 B1* | 6/2003 | Nguyen | G06F 8/41 | 706/15 |
| 6,832,214 B1* | 12/2004 | Nguyen | G06F 8/41 | 706/15 |
| 7,051,097 B1* | 5/2006 | Pecina | H04L 67/34 | 707/999.104 |
| 7,822,875 B1* | 10/2010 | Hutchison | H04L 69/22 | 370/392 |
| 8,190,720 B1* | 5/2012 | Yellai | H04L 67/34 | 709/221 |
| 8,595,787 B2* | 11/2013 | Riley | H04L 12/5695 | 726/1 |
| 2003/0033519 A1* | 2/2003 | Buckman | H04L 67/2823 | 716/153 |
| 2004/0143823 A1* | 7/2004 | Wei | G06F 8/41 | 717/140 |
| 2005/0273772 A1* | 12/2005 | Matsakis | G06F 8/41 | 717/136 |
| 2008/0134133 A1* | 6/2008 | DelloStritto | H04L 67/10 | 717/101 |
| 2011/0085461 A1* | 4/2011 | Liu | H04L 43/12 | 370/252 |
| 2012/0324083 A1* | 12/2012 | Lee | H04L 67/1002 | 709/223 |
| 2013/0132533 A1* | 5/2013 | Padmanabhan | H04L 41/0823 | 709/220 |

OTHER PUBLICATIONS

Monsanto et al., "A compiler and run-time system for network programming languages," 2012, Proceedings of the 39th annual ACM SIGPLAN-SIGACT symposium on Principles of programming languages, pp. 217-230.*

(Continued)

*Primary Examiner* — Thuy Dao
*Assistant Examiner* — Stephen Berman
(74) *Attorney, Agent, or Firm* — Brandon C. Kennedy; Kennedy Lenart Spraggins LLP (57) ABSTRACT

The method includes receiving, by a data plane definition language compiler, a first data plane definition describing customized functionality of a data plane of a first network application, and compiling the data plane definition to generate a first set of customized data processing modules and a program interface that allows a control plane of the network application to access the first set of customized data processing modules. The method also includes loading the first set of customized data processing modules into a data plane container, wherein the network application is executed via a network operating system, and wherein, upon execution of the network application the customized data processing module causes the data plane container of the network application to process packets differently than prior to loading the customized data processing module in the data plane container.

12 Claims, 11 Drawing Sheets

(56) References Cited

OTHER PUBLICATIONS

August et al., "A disciplined approach to the development of platform architectures," 2002, Microelectronics Journal, vol. 33, Issue 11, pp. 881-890.*

Morandi et al., "Design and implementation of a framework for creating portable and efficient packet-processing applications," 2008, Proceedings of the 8th ACM international conference on Embedded software, pp. 237-244.*

* cited by examiner

PRIOR ART

FIG. 1

PRIOR ART

METHOD AND SYSTEM FOR DATA PLANE ABSTRACTION TO ENABLE A DYNAMIC CREATION OF NETWORK APPLICATIONS

BACKGROUND

Since the inception of computer networks, the size of networks has grown exponentially. Today, any number of computing devices may be connected over a network, and data and services provided by those devices may be accessed from any number of locations. With that growth, the complexity of managing and troubleshooting networks has dramatically increased.

At the same time a new set of applications in the area of data centers and cloud computing are pushing the requirements of dynamic provisioning and dynamic instantiation of the network infrastructure. These requirements are rapidly expanding in other segments of the IT infrastructures where networking applies.

In traditional computer networks, data paths are implemented by interconnecting switches, routers, and other network devices throughout the network. Traditional computer networks can be too rigid and complex for these new environment requirements. Network virtualization is a set of evolving concepts aiming at allowing network administrators to have control over traffic across the network without physically modifying network devices. Network virtualization is one of the use cases usually associated to software defined networking solutions.

SUMMARY

In general, in one aspect, the invention relates to method for network application development. The method includes receiving, by a data plane definition language compiler, a first data plane definition describing customized functionality of a data plane of a first network application, and compiling the data plane definition to generate a first set of customized data processing modules and a program interface that allows a control plane of the network application to access the first set of customized data processing modules. The method also includes loading the first set of customized data processing modules into a data plane container, wherein the network application is executed via a network operating system, and wherein, upon execution of the network application the customized data processing module causes the data plane container of the network application to process packets differently than prior to loading the customized data processing module in the data plane container.

In general, in one aspect, the invention relates to a method of network application development. The method includes receiving, by a control plane object model compiler, an uncompiled object model of the control plane of a first network application, and compiling the uncompiled object model to generate a compiled object model of the control plane of the network application and a programmatic interface for the network application. The method also includes loading the user interface into an interface gateway, wherein, upon execution of the first network application the interface gateway communicates with the compiled object model of the control plane using the programmatic interface, and wherein the control plane of the network application communicates with a first set of customized data processing modules of a data plane of the first network application.

In general, in one aspect, the invention relates to a computer program product including computer readable code executable by a processor to receive, by a data plane definition language compiler, a first data plane definition describing customized functionality of a data plane of a first network application, and compile the data plane definition to generate a first set of customized data processing modules and a program interface that allows a control plane of the network application to access the first set of customized data processing modules. The computer readable code is also executable by a computer processor to load the first set of customized data processing modules into a data plane container, wherein the network application is executed via a network operating system, and wherein, upon execution of the network application the customized data processing module causes the data plane container of the network application to process packets differently than prior to loading the customized data processing module in the data plane container.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

DETAILED DESCRIPTION

In the following detailed description of exemplary embodiments of the invention, specific exemplary embodiments in which the invention may be practiced are described in sufficient detail to enable those skilled in the art to practice the invention. The following detailed description is, therefore, not to be taken in a limiting sense, and the scope of the present invention is defined by the appended claims and equivalents thereof.

The terminology used herein is intended to describe particular embodiments only and is not intended to be limiting of the invention. As used herein, the singular forms "a", "an" and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by executable computer program instructions (or computer code). These computer program instructions may be provided to a processor of a general purpose computer, special purpose computer, or other programmable data processing apparatus to produce a machine, such that the instructions, which execute via the processor of the computer or other programmable data processing apparatus, implement the methods/processes/functions/acts specified in the one or more blocks of the flowchart(s) and/or block diagram(s).

These computer program instructions may also be stored in a tangible computer readable storage device that can direct a computer to function in a particular manner, such that the computer readable storage device is an article of manufacture (or computer program product) including instructions which implement the method/process/function/act specified in the one or more blocks of the flowchart(s) and/or block diagram(s). The computer program instructions may also be loaded onto a computer, other programmable data processing apparatus, or other devices to cause a series of operational steps to be performed on the computer, other programmable apparatus or other devices to produce a computer implemented process/method, such that the instructions which execute on the computer or other programmable apparatus implement the method/process/functions/acts specified in one or more blocks of the flowchart(s) and/or block diagram(s).

It is understood that the use of specific component, device and/or parameter names (such as those of the executing utility/logic described herein) are for example only and not meant to imply any limitations on the invention. The invention may thus be implemented with different nomenclature/terminology utilized to describe the components, devices, or parameters herein, without limitation. Each term utilized herein is to be given its broadest interpretation given the context in which that terms is utilized.

Figure 1:
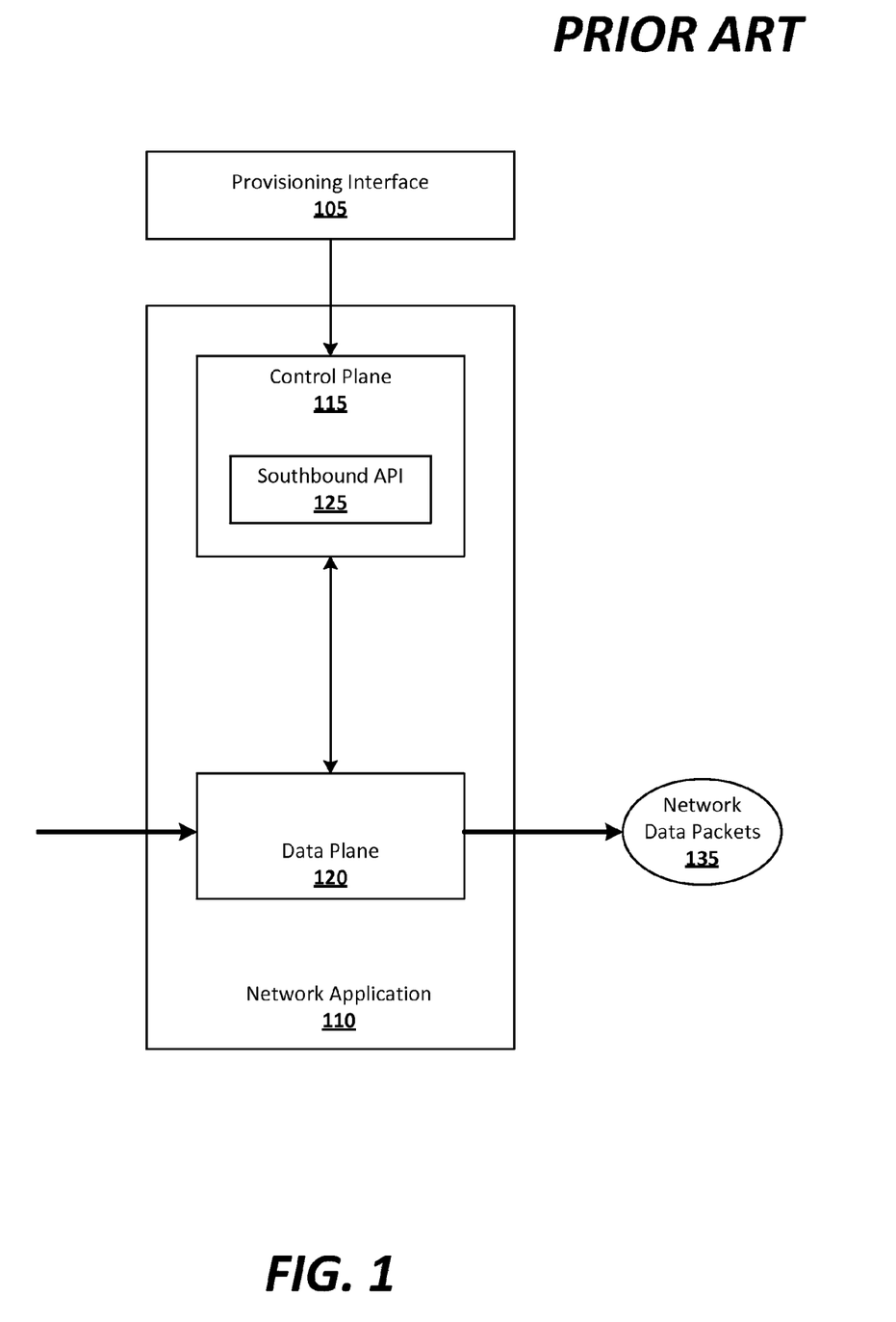
FIG. 1 shows an architecture of a network application and its components.

Turning to the figures, FIG. 1 depicts a network application architecture, as exists in the prior art. Specifically, FIG. 1 depicts a current data flow for a network application architecture. As depicted, FIG. 1 includes a provisioning interface 105 and a network application 110. A user, such as a network application administrator, can transmit commands to the network application 110 via provisioning interface 105. The provisioning interface 105 may include, for example, a graphical user interface (GUI), a command line interface, or an application programming interface (API).

Network application 110 includes control plane 115 and data plane 120. Control plane 115 includes a southbound API 125. Control plane 115 receives commands, such as provisioning commands, from a user, and based on control plane logic internal to control plane 115, control plane 115 directs data plane 120 on how to perform certain networking functions on network data packets 135 in the data plane 120.

The communication between control plane 115 and data plane 120 is conducted through a set of APIs. Southbound API 125 allows data to pass between the control plane 115 and the data plane 120 in order to provide instructions to the data plane 120. Specifically, southbound API 125 allows data to be transmitted from control plane 115.

Figure 2:
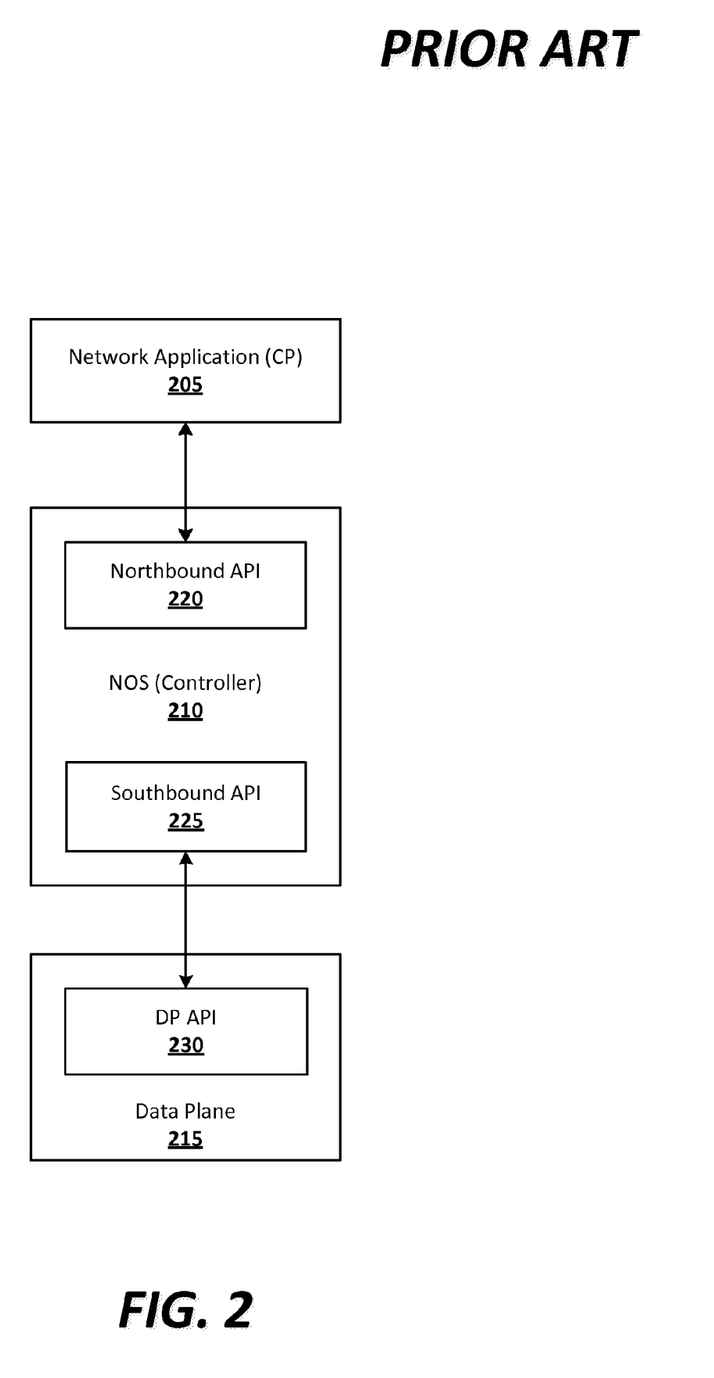
FIG. 2 shows an architecture where the invention extends existing network architectures.

FIG. 2 depicts a networking architecture well understood in the networking world. Specifically, FIG. 2 depicts a network operating system (NOS), or controller, 210 communicably connected to a network application control plane 205 and a data plane 215. In one or more embodiments, network application control plane 205 may include one or more network applications. The system depicted in FIG. 2 shows how current systems deliver more than one network application within a system. The control plane 205 of the network application, rather than communicating directly with the data plane 215, interacts with the controller or NOS 210 that, in turn, communicates with the data plane 215. Communication across the NOS 210 is achieved by northbound API 220 and southbound API 225. Data is received by NOS 210 from network application control plane 205 via northbound API 220. In addition, data is transmitted from NOS 210 to data plane 215 via southbound API 225. At data plane 215, data is received at data plane API 230.

Figure 3:
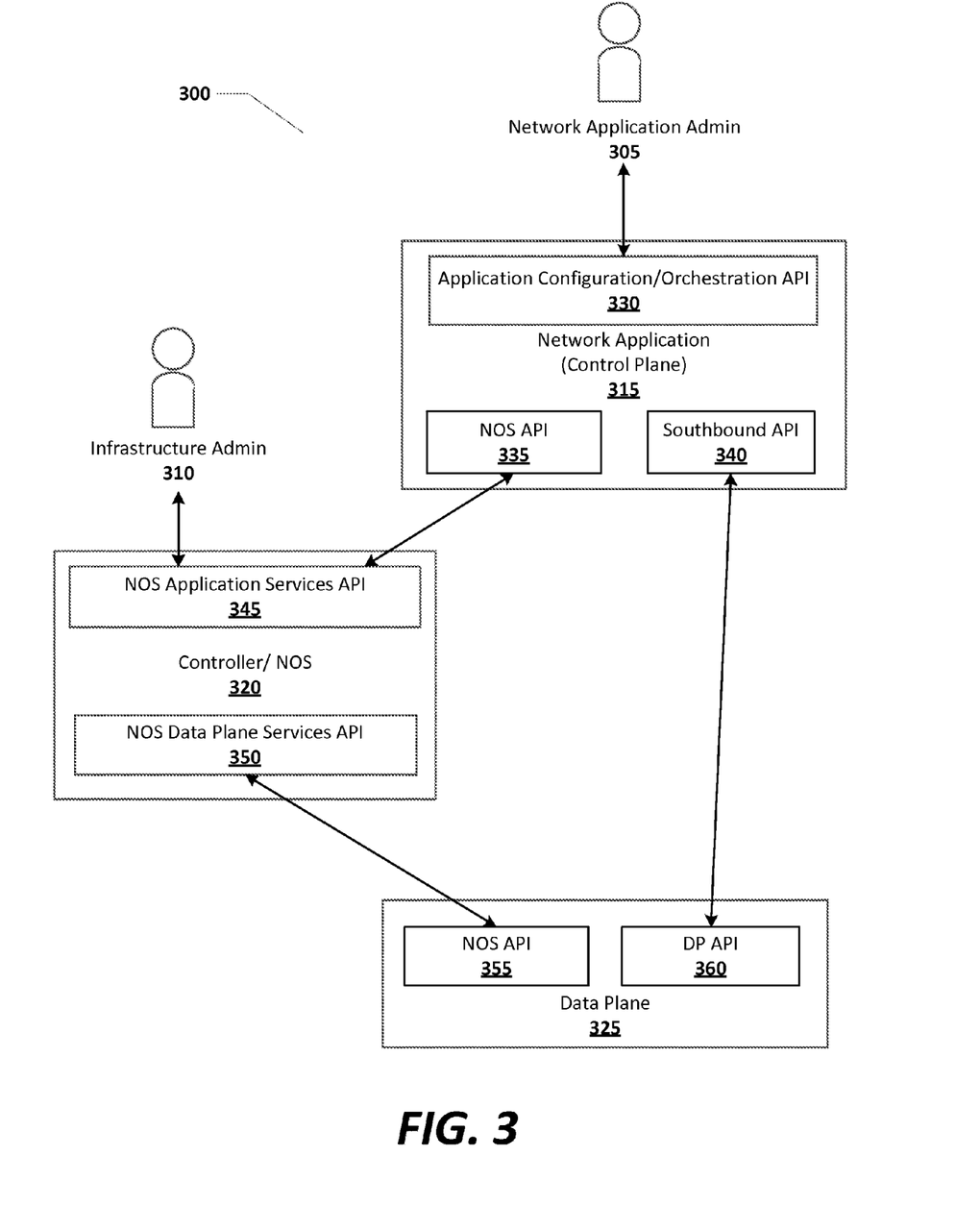
FIG. 3 shows a networking architecture, in which the invention may be practiced, according to one or more embodiments.

FIG. 3 depicts a networking architecture, in which the invention may be practiced, according to one or more embodiments. Specifically, FIG. 3 depicts a network environment in which one or more network administrators may manage network applications, according to one or more embodiments. As depicted, the network includes a network application control plane 315, a network operating system (NOS, or controller) 320, and a data plane 325. Each of control plane 315, data plane 325, and NOS 320 may be stored across one or more computing devices including one or more of a computer processor, memory, and a computer readable storage device including computer code executable by the computer processor. Memory may be random access memory (RAM), cache memory, flash memory, or any other kind of storage structure or device that is configured to store computer instructions/code executable by a computer processor to store data utilized during such execution. The computer readable storage device may be any kind of computer storage device, volatile or non-volatile, such as a hard disk, an optical drive such as a compact disk drive or digital video disk (DVD) drive, and a flash memory drive.

In one or more embodiments, the control plane 315 of the network application includes an orchestration API 330, a network operating system API 335, and a southbound API 340. Each of orchestration API 330, NOS API 335, and southbound API 340 is a programmatic interface that includes computer code executable by a computer processor to allow users or external modules to interoperate with the control plane 315. Specifically, orchestration API 330 allows a user or other management module to communicate with control plane 315. NOS API 335 is a programmatic interface that includes computer code that allows the control plane 315 to communicably connect to a network operating system 335. Southbound API 340 is a programmatic interface that allows the control plane to communicate with the data plane 325 in order to control the behavior of data plane 325.

In one or more embodiments. NOS 320 includes an application services API 345 and a data plane services API 350. Application services API is a programmatic interface that interacts with NOS API 335 to allow NOS 325 to communicate with control plane 315. In addition, in one or more embodiments, NOS Application services API 345 receives instruction from an infrastructure administrator 310, or other management module in the system. NOS data plane services API 350 is a programmatic interface that allows NOS 320 to communicate with data plane 325.

As depicted, data plane 325 includes NOS API 355 and DP API 360. In one or more embodiments, NOS API 355 is a programmatic interface that allows NOS 320 to communicate with data plane 325 via NOS data plane services API 350. DP API 360 is a programmatic interface that allows data pane 325 to receive management instructions from control plane 315 via southbound API 340.

Each of the control plane 315, data plane 325, and NOS 320 may be managed by one or more human, mechanical, or computational administrators. As depicted, network application admin 305 manages the control plane 315, while infrastructure admin 310 manages the NOS 320. However, those skilled in the art will appreciate that any of network application admin 305 and infrastructure admin 310 may be replaced by a single entity, or one or more computing modules.

According to one or more embodiments, the system depicted in FIG. 3 allows for the instantiation of multiple concurrent Network Applications, although for purposes of clarity, FIG. 3 depicts only a single instantiation of a Network Application. The communicable linkage between the southbound API 340 of the control plane 315, and the data plane API 360, allows communication from the control plane 315 to bypass to NOS 320 and communicate directly with the data plane 325.

Figure 4:
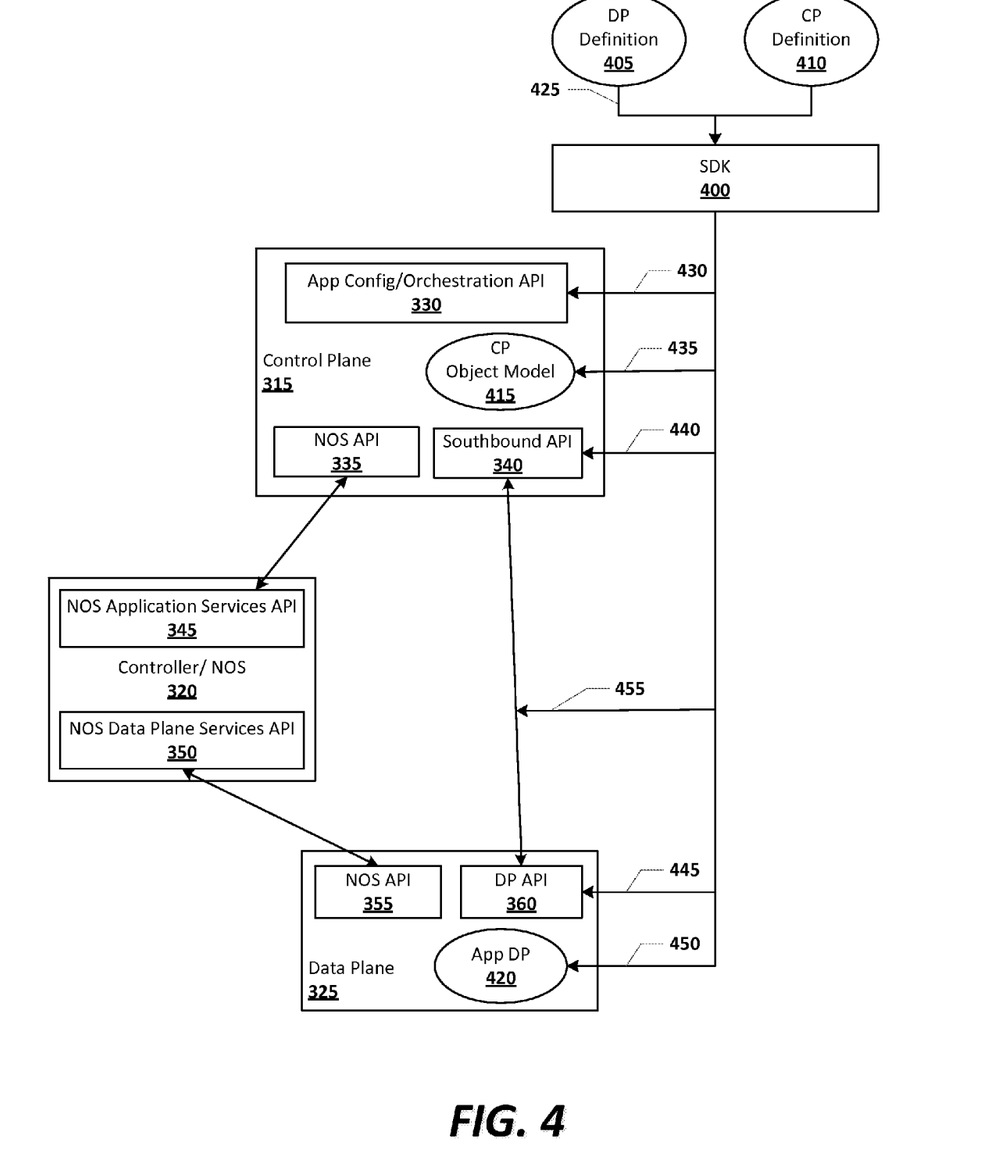
FIG. 4 shows a detailed network architecture in which the invention may be practiced, according to one or more embodiments.

FIG. 4 shows a flow diagram in a detailed network architecture in which the invention may be practiced, according to one or more embodiments. Specifically, FIG. 4 includes the control plane 315 NOS 320, and data plane 325 components from FIG. 3, but illustrates with more specificity the development process of the network architecture. According to one or more embodiment, the infrastructure depicted in FIG. 4 illustrates how a software development kit (SDK) 400 may be utilized in order to customize a software-defined network environment for a particular network application. According to one or more embodiments, the customizable network environment eliminates the dependency between a network operating system, control plane, and data plane. The customizable network environment allows for better scalability, and prevents architecture gridlock so that individual components (such as control plane or data plane) may be modified independently, as needed. In addition, the customized network architecture enables a third party developer to modify preexisting functional components of a network operating system.

As depicted in FIG. 4, an SDK 400 may be utilized to generate a set of new network applications not previously envisioned when the data plane container 325 or NOS 320 were created. SDK 400 includes computer readable code executable by a computer processor to provide a development tool that allows the development of a particular network application, including generating customized network environment. SDK 400 may be a set of tools, compilers workflows and programmatic interface, such as an application program interface (API), or a more complete development environment to allow for generation of network applications. The flow of data is enumerated within FIG. 4. However, the order each data flow is marked does not necessarily indicate the order in which data flows throughout the system.

At 425, SDK is utilized in generating data plane (DP) definition 405 and control plane (CP) definition 410 for a particular network application. Although FIG. 4 depicts DP definition 405 and CP definition 410 being handled by a single instance of SDK 400, DP definition 405 and CP definition 410 may be generated on separate instances of SDK 400, and even by separate parties on separate computing devices across a distributed computing environment or network. According to one or more embodiments, DP definition 405 and CP definition 410 are received in a domain specific language.

According to one or more embodiments, DP definition 405 describes a customized functionality of a data plane of a network application. In one or embodiments, SDK 400 processes the DP definition 405 to generate DP API 360 and customized data processing module 420 for the network application. At 445, SDK 400 deploys DP API 360 into data plane 325, and at 450, SDK 400 deploys the customized data plane module 420 into the data plane 325.

In one or more embodiments, customized data processing module 420 causes the data plane 325 to process packets differently than it would prior to loading customized data processing module 420. In one or more embodiments, customized data processing modules are configured to perform functions configurable by a user. Those functions may include, for example, parse, lookup, update, and modify. According to one or more embodiments, the function of parse determines a structure of an incoming block of data into the data plane. According to one or more embodiments, the function of lookup identifies a set of relevant rules for a specific packet from a set of tables. According to one or more embodiments, the function of update includes modifying an internal state of the data processing module based on the combination of rules extracted from the lookup state and the incoming packet. According to one or more embodiments, the function of modify includes a set of rewrite capabilities to generate new headers of blocks of data that will be sent out of the data processing module.

According to one or more embodiments, CP definition 410 is uncompiled computer code for an object model of the control plane for the particular network application. In one or more embodiments, SDK 400 processes the CP definition 410 to generate a compiled control plane object model 415 and southbound API 340, as well as an orchestration API 330. At 430, SDK 400 deploys the orchestration API 330 into control plane 315. At 435, SDK 400 deploys the compiled CP object model 415 into control plane 315. At 440, SDK 400 deploys the southbound API 340 into control plane 315.

In one or more embodiments, the various components of the control plane 315 and data plane 325 of a particular network application need to be linked. The link may be generated by SDK 400 as part of processing either DP definition 405 or CP definition 410. Alternatively, the link between the various components may be generated separately from the CP and DP components, and may be generated by a third party that did not generate either the CP or DP components. As depicted, the linked code is deployed at 455 and allows the southbound API 340 and DP API 360 to become communicably connected.

In one or more embodiments, the linkage between the control plane 315 and the data plane 325 prevents the control plane 315 of a particular network application to interact with the data plane of another network application. Thus, the control plane of a first network application and the control plane of a second network application may concurrently communicate with a single data plane container to access their respective customized data processing modules. In one or more embodiments, the separation between each network application's control plane and corresponding data plane is enforced by the instructions that NOS 320 applies to data plane 325.

Figure 5:
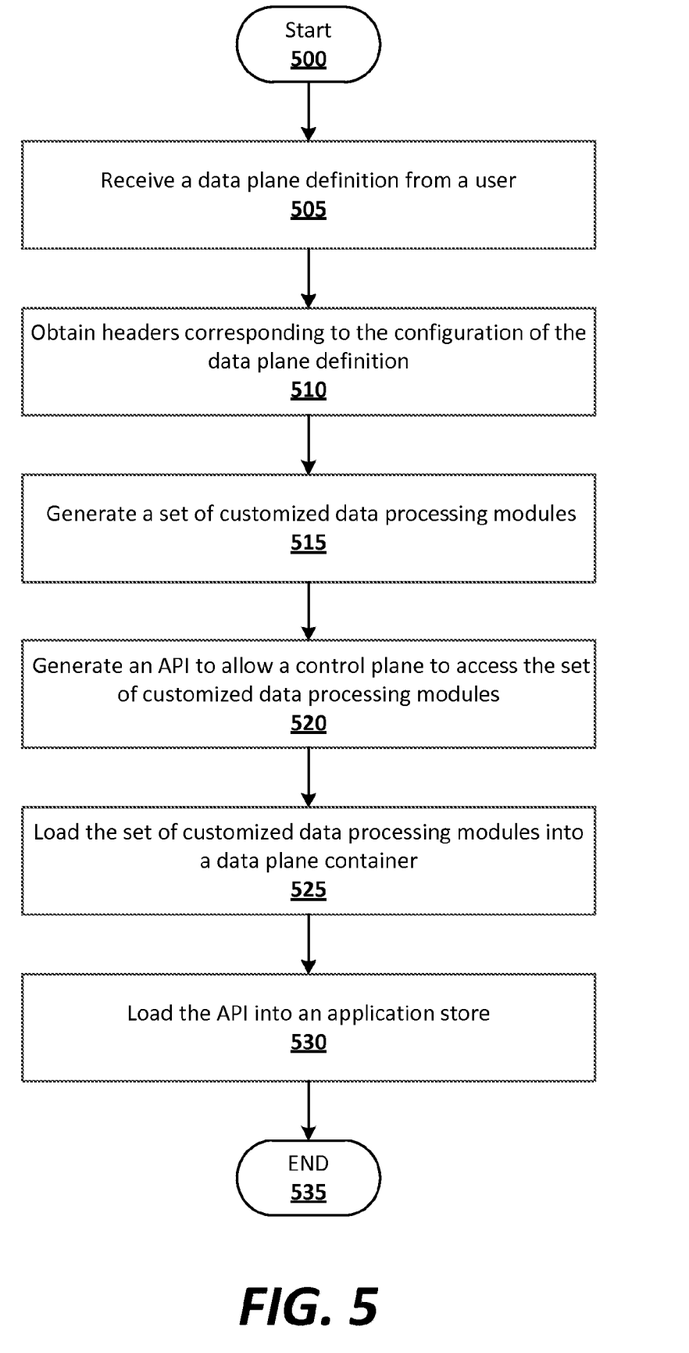
FIG. 5 shows a flow chart depicting a method for generating a data plane for a network application according to one or more embodiments.
Figure 6:
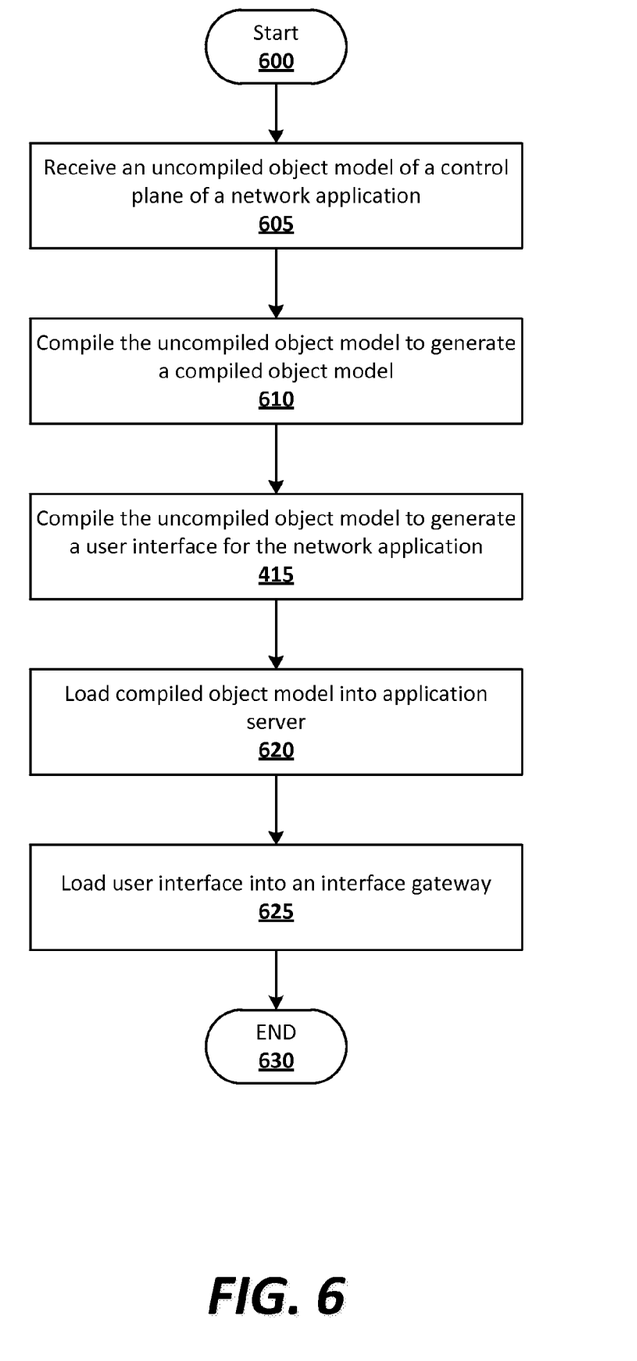
FIG. 6 shows a flow chart depicting a method for generating a control plane for a network application according to one or more embodiments.
Figure 7:
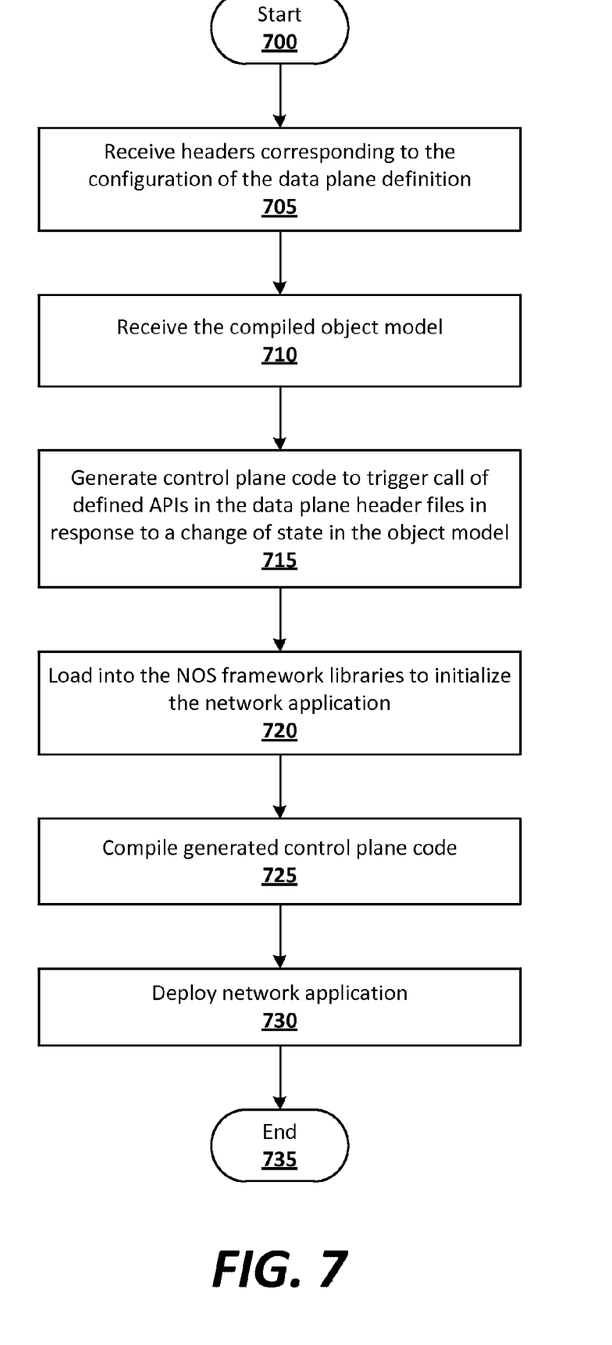
FIG. 7 shows a flow chart depicting a method for deploying a network application, according to one or more embodiment.

FIGS. 5-7 depict various flow charts illustrating various aspects of the disclosure. Each of the flowcharts includes various steps depicted in a particular order, although in one or more embodiments the various steps may be performed in a different order, or perhaps simultaneously. For purposes of clarify, citation will be made to FIG. 4. However, any indication that a particular step is performed by a particular module depicted in FIG. 4 is merely for exemplary purposes and is not necessarily intended to limit the scope of the disclosure.

FIG. 5 shows a flow chart depicting a method for generating a data plane for a network application according to one or more embodiments. The method begins at block 500. At block 505, a data plane definition language compiler (DPDL compiler) receives a data plane definition from a user. In one or more embodiments, the data plane definition is written in a domain specific language. The data plane definition describes a customized functionality of a data plane of a network application. According to one or more embodiments, the data plane definition provides a customized functionality of the data plane. Said another way, a data plane of a network application will process packets differently based on the data plane definition.

At block 510, the DPDL compiler obtains header files corresponding to the configuration of the data plane definition. In one or more embodiments, header files are stored in a header file store that may be a database or any other data structure configured to store header files. In one or more embodiments, the DPDL compiler references the header file store to determine how to compile the data plane definition. At block 515, the DPDL compiler generates a set of customized data processing modules, and at block 520, the DPDL compiler generates an API to allow a control plane of the network application to access the set of customized data processing modules generated at block 515.

The method continues at block 525, and the DPDL compiler, with the help of the NOS, loads the generated set of customized data processing modules into a data plane container. At block 530, the DPDL compiler loads the generated API into the application store. The method ends at block 535.

FIG. 6 depicts a flow chart depicting a method for compilation of a control plane object model, according to one or more embodiments of the invention.

The method begins at block 600. At block 605, a control plane object model compiler (CPOM compiler) receives an uncompiled object model of a control plane of a network application. In one or more embodiments, the object model is received in a domain specific language.

At block 610, the CPOM compiler compiles the uncompiled object model to generate a compiled object model. At block 615, and the CPOM compiler compiles the uncompiled object model to generate a program interface that allows a user or module to communicate with the control plane of the network application.

The method continues at block 620, and the CPOM compiler loads the object model into an application server 620. In one or more embodiments, the CPOM compiler may load the object model into the same or similar location as the location of a corresponding API of the network application, as described with respect to FIG. 5. The method continues at block 625, and the CPOM compiler loads the program interface into an interface gateway with the help of the NOS. The method ends at block 630.

FIG. 7 shows a flow chart depicting a method for deploying a network application, according to one or more embodiment. The method begins at block 700. At block 705, SDK 400 receives hearers corresponding to the configuration of the data plane definition. In one or more embodiments, SDK 400 includes functionality to determine a particular configuration and retrieve the corresponding header files from a data store. At 710, SDK 400 receives (or generates) the compiled version of the control plane object model 415.

At block 715, SDK 400 generates control plane code to trigger a call of defined API's in the data plane header files in response to a change of state in the object model.

At block 720, SDK 400 loads libraries into the NOS framework 320 to initialize the network application. At block 725, SDK 400 compiles the generated control plane code, and at block 530, SDK 200 deploys the network application. The method ends at block 735.

In each of the flow charts described above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Figure 8:
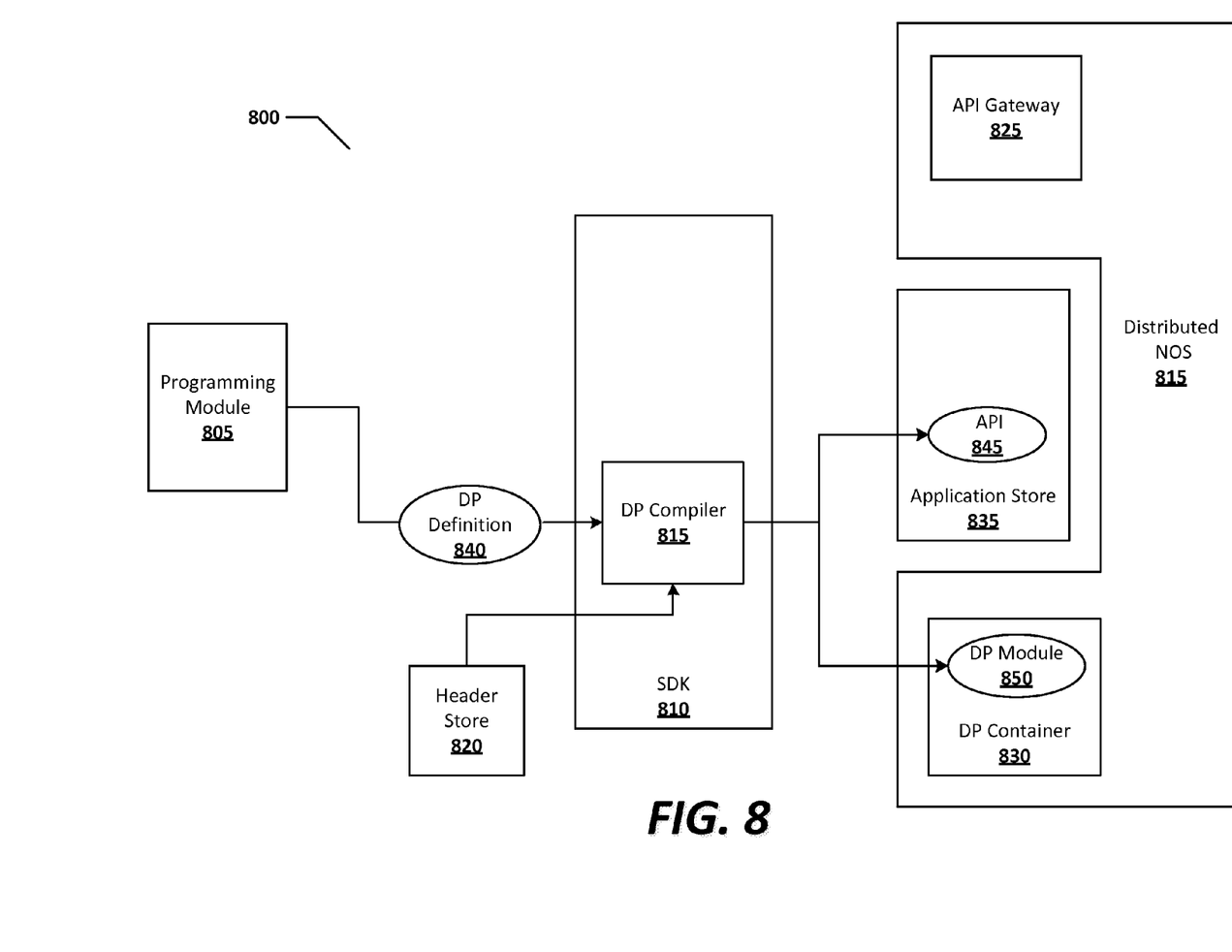
FIG. 8 depicts an example flow diagram for compilation of a data plane definition language, according to one or more embodiments of the invention.

FIG. 8 depicts an example flow diagram for compilation of a data plane definition language, according to one or more embodiments of the invention. Specifically, FIG. 8 depicts a flow diagram 800 of DPDL compiler 815 receiving a data plane definition 840 and generating an API 845, and at least one customizable data processing module 850. As depicted, Programming module 805 communicates with SDK 810, which, in turn, generates and deploys various modules across application store 835 and components of distributed NOS 815, which includes connectivity to a data plane container 830, and an API gateway 825.

The diagram flow begins with programming module 805 transmitting a data plane definition 840 to a DPDL compiler 815 that, according to one or more embodiments, is located within SDK 810. In one or more embodiments, programming module 805 may be a functional computing component generating the DP definition 840, or may be a human user providing the DP definition 840.

Upon receiving data plane definition 840, DPDL compiler 815 accesses header store 820 to identify the appropriate header file. In one or more embodiments, DPDL compiler 815 assesses the configuration of the DP definition 840 to determine the appropriate header file.

In response to compiling the data plane definition 840, DPDL compiler 815 generates a data plane API 845 and one or more customized data processing modules 850. In one or more embodiments, the generated DP API 845 allows communication between the data plane and the control plane for the network application. In one or more embodiment, the customized data processing module 850 causes the data plane container of the network application to process packets differently than prior to loading the customized data processing module in the data plane container 830. The data processing module 850 may be composed by a single instance or multiple instances. Multiple instances of the data processing module 850 may be presented as a single instance through a data plane abstraction or as multiple instances at the request of the Network Application developer.

Figure 9:
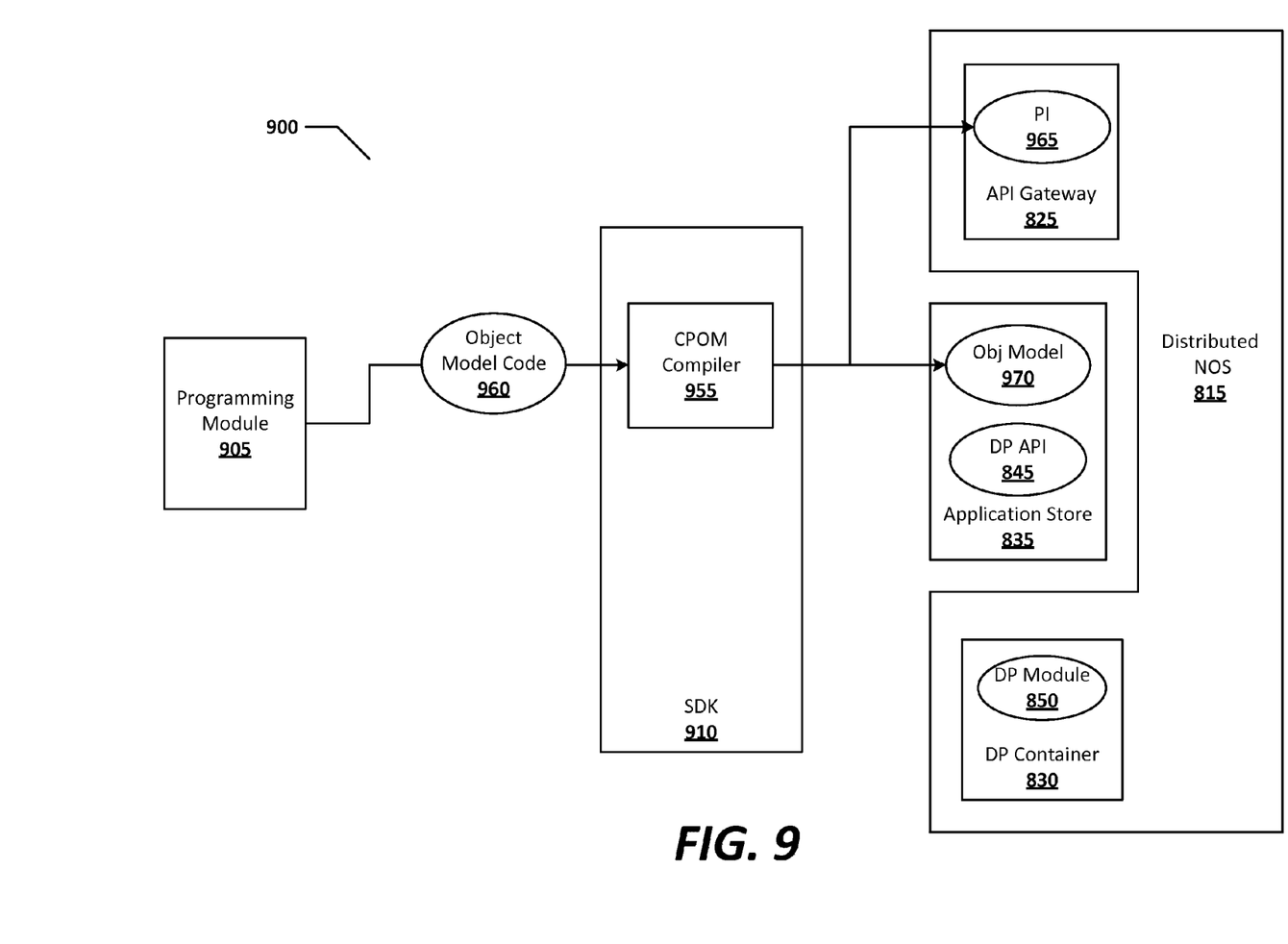
FIG. 9 depicts an example flow diagram for compilation of a control plane definition language, according to one or more embodiments of the invention.

FIG. 9 depicts an example flow diagram for compilation of a control plane definition language, according to one or more embodiments of the invention. Specifically, FIG. 9 depicts a flow diagram 900 of CPOM compiler 955 receiving object model code 960 from programming module 905 and generating a programming interface 965, and a compiled object model of the control plane of a network application 970.

The flow diagram begins with programming module 805 transmitting the object model code 960 to a CPOM compiler 955 that, according to one or more embodiments of the invention, is located within SDK 910.

Upon receiving object module code 960, CPOM compiler 955 generates a programmatic interface and loads the programmatic interface 965 into API gateway 925. According to one or more embodiments, programmatic interface 965 allows a user or functional module to communicate with the control plane of the network application. CPOM compiler 955 also generates a compiled object model 970, and loads the compiled object model 970 into application store 935.

Figure 10:
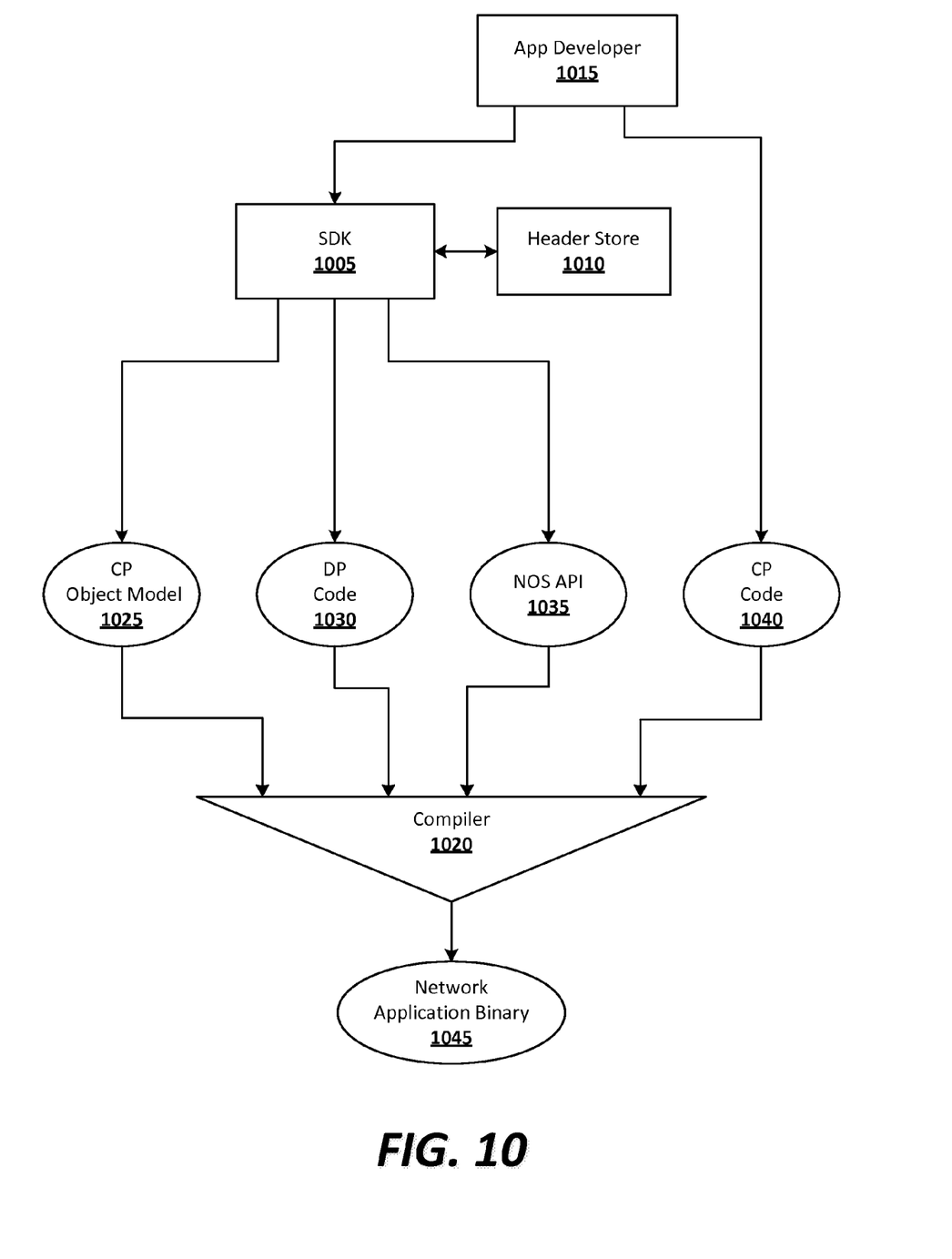
FIG. 10 depicts an example flow diagram for communicatively connecting control plane and data plane components, according to one or more embodiments of the invention.

FIG. 10 depicts an example data flow of one implementation, according to one or more embodiments. Specifically, FIG. 10 depicts the flow of data during the method depicted in FIG. 9, in which compiler 1020 generates a network application.

Data required to generate the network application comes from at least three sources, including a software development kit (SDK) 1005, a header store 1010, and an application developer 1015. SDK 1005 includes computer readable code executable by a computer processor to provide a development tool that allows the development of a particular network application, including generating customized network environment. SDK 1005 may be a set of tools, compilers workflows and programmatic interface, such as an application program interface (API), or a more complete development environment to allow for generation of network applications. SDK 1005 is utilized by a user to generate control plane object model 1025 and data plane code 1030. In one or more embodiments, control plane object model 1025. In one or more embodiments, some or all of the code generated by SDK 1005 may be received or generated utilizing input received by Application Developer 1015.

Header store 1010 includes various headers that indicate how a particular configuration of computer code should be handled by the compiler 1020 and provides the proper NOS API 1035. In one or more embodiments, SDK 1005 accesses header store 1010 to determine a particular configuration of a control plane or data plane definition in order to generate NOS API 1035.

The final code received by compiler 1020 in FIG. 10 is provided by an App Developer 1015. In one or more embodiments, App Developer 1015 provides control plane code 1040.

Upon receiving the control plane object model 1025, the data plane code 1030, the NOS API 1035, and the control plane code 1040, compiler 1020 generates network application binary code 1045. Network application binary code 1045 may then be deployed.

Figure 11:
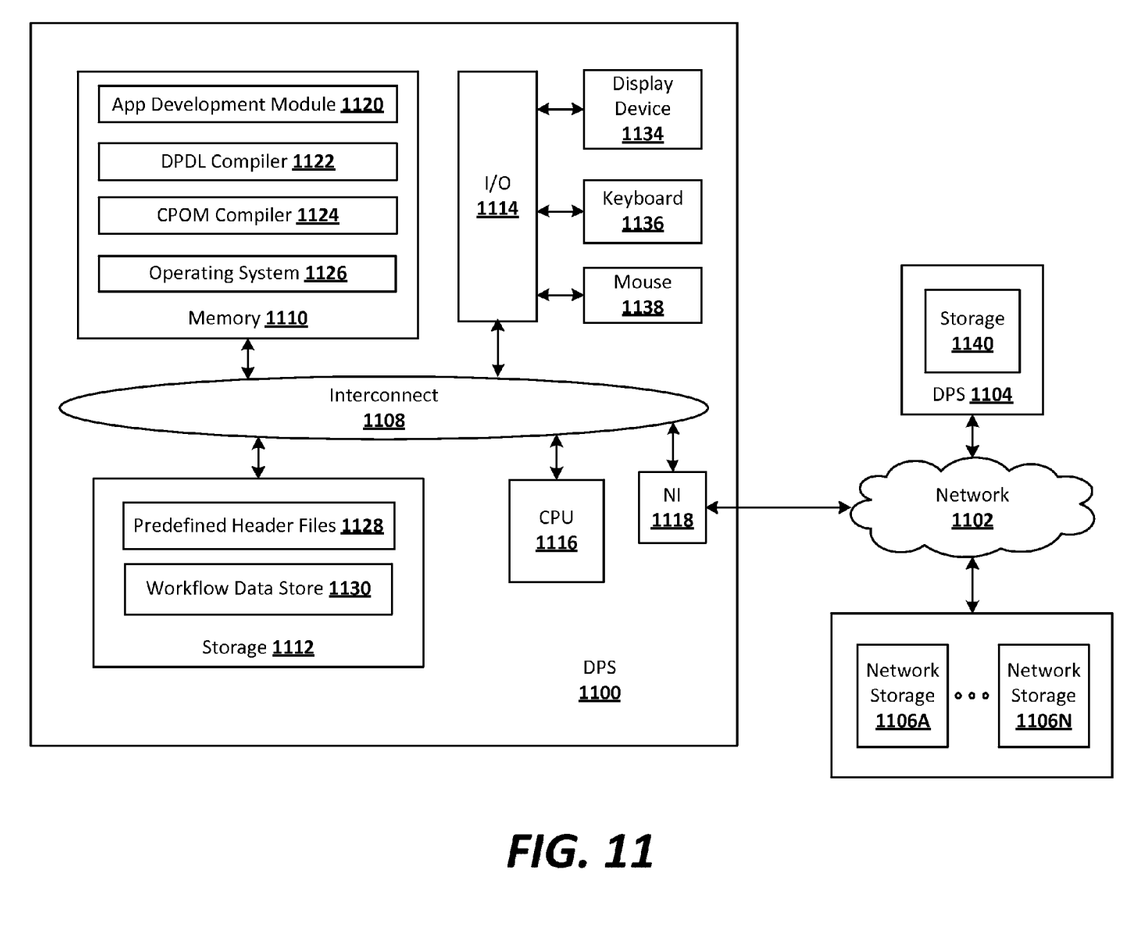
FIG. 11 depicts an example data processing system for a host in the network architecture, according to one or more embodiments of the invention.

FIG. 11 depicts an example data processing system for a host in the network architecture, according to one or more embodiments of the invention. Specifically. FIG. 11 depicts an example DPS 1100 communicable with another DPS 1104, or network storage 1106A-1106N across a network 1102, within which the functional aspects of the described embodiments may advantageously be implemented. In one or more embodiments, a user may develop network applications using DPS 1100.

DPS 1100 includes numerous components logically connected by Interconnect 1108. Specifically, FIG. 11 depicts DPS 1100 including Memory 1110, central processing unit (CPU) 11.16 (also interchangeably referred to as a processor), Storage 1112, Input/Output (I/O) controller 1114, and network interface card (NIC) 1118. In addition. FIG. 11 depicts that DPS 1100 may be connected via NIC 1118 to Network Storage 1106A-1106N and a second DPS 1104 across Network 1102.

Those skilled in the art will appreciate that CPU 1116 can also be any kind of hardware processor. I/O controller 1114 allows a user to interface with DPS 1100. As depicted, I/O controller 1114 provides an interface for such devices as Display Device 1134, Keyboard 1136, and Mouse 1138. According to one or more embodiments, Display Device 1134 may include output means such as a liquid crystal display (LCD), a plasma display, a cathode ray tube (CRT) monitor, or any other kind of display device.

Memory 1110 may be random access memory (RAM), cache memory, flash memory, or any other kind of storage structure that is configured to store computer instructions/code executable by CPU 1116 and/or data utilized during such execution. As depicted, Memory 1110 includes Operating System 1126. Operating System 1126 may be any platform that manages the execution of computer code and manages hardware resources.

Memory 1110 also includes a plurality of functional modules, such as application development module 1120, DPDL compiler 1122, and CPOM compiler 1124. It is appreciated that one or more of these modules can be distributed across network 1102.

As depicted, DPS 1100 also includes Storage 1112. Storage 1112 may be any kind of computer storage device, such as a hard disk, an optical drive such as a compact disk drive or digital video disk (DVD) drive, and a flash memory drive. Storage 1112 includes predefined header files 1128, and workflow data store 1130.

Those skilled in the art will appreciate that the software aspects of an illustrative embodiment of the present invention are capable of being distributed as a computer program product in a variety of forms, and that an illustrative embodiment of the present invention applies equally regardless of the particular type of computer-readable storage device used to actually store the software aspects of the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for network application development, the method comprising:

receiving, by a data plane definition language compiler, a first data plane definition describing customized functionality of a data plane of a first network application;

compiling the data plane definition to generate a first set of customized data processing modules and a program interface that allows a control plane of the network application to access the first set of customized data processing modules;

loading the first set of customized data processing modules into a data plane container, wherein the network application is executed via a network operating system, and wherein, upon execution of the network application the first set of customized data processing modules causes the data plane container of the network application to process packets differently than prior to loading the first set of customized data processing modules in the data plane container; and in response to receiving a second data plane definition:
  dynamically generating a second set of customized data processing modules; and
  dynamically loading the second set of customized data processing modules into the data plane container;
  wherein the network operating system prevents the first network application from accessing the second set of customized data processing modules; and
  wherein the network operating system prevents the second network application from accessing the first set of customized data processing modules.

2. The method of claim 1, wherein the control plane of the first network application and the control plane of the second network application concurrently communicate with the data plane container to access the respective customized data processing modules.

3. The method of claim 1, wherein the data plane definition is received in a domain specific language.

4. The method of claim 1, wherein the customized data processing modules are configured to perform configurable functions including parse, lookup, update, and modify, wherein the configurable function of parse comprises determining the structure of incoming blocks of data;
  wherein the configurable function of lookup comprises identifying a set of relevant rules for the specific packet at hand from a set of tables;
  wherein the configurable function of update comprises modifying an internal state of the data plane processing module based on the combination of rules extracted from the lookup state and the incoming packet, and
  wherein the configurable function of modify comprises a set of rewrite capabilities to generate new headers of blocks of data that will be sent out of the data plane processing module.

5. The method of claim 1, wherein the data plane container orchestrates an execution order of the first set of customized data processing modules and the second set of customized data processing modules by connecting the individual customized data processing modules according to a configuration policy.

6. The method of claim 1, wherein the customized data processing module is composed of multiple instances through an abstraction of the data plane.

7. A computer program product for network application development, the computer program product comprising: a non-transitory computer readable storage device; and computer readable code, stored on the computer readable storage device and executable by a computer processor to:

receive, by a data plane definition language compiler, a first data plane definition describing customized functionality of a data plane of a first network application;

compile the data plane definition to generate a first set of customized data processing modules and a program interface that allows a control plane of the network application to access the first set of customized data processing modules; and load the first set of customized data processing modules into a data plane container, wherein the network application is executed via a network operating system, and wherein, upon execution of the network application the customized data processing module causes the data plane container of the network application to process packets differently than prior to loading the customized data processing module in the data plane container; and in response to receiving a second data plane definition:
  dynamically generate a second set of customized data processing modules; and
  dynamically load the second set of customized data processing modules into the data plane container,
  wherein the network operating system prevents the first network application from accessing the second set of customized data processing modules; and
  wherein the network operating system prevents the second network application from accessing the first set of customized data processing modules.

8. The computer program product of claim 7, wherein the control plane of the first network application and the control plane of the second network application concurrently communicate with the data plane container to access the respective customized data processing modules.

9. The computer program product of claim 7, wherein the data plane definition is received in a domain specific language.

10. The computer program product of claim 7, wherein the customized data processing modules are configured to perform configurable functions including parse, lookup, update, and modify,
  wherein the configurable function of parse comprises determining the structure of incoming blocks of data;
  wherein the configurable function of lookup comprises identifying the set of relevant rules for the specific packet at hand from a set of tables;
  wherein the configurable function of update comprises modifying an internal state of the data plane processing module based on the combination of rules extracted from the lookup state and the incoming packet; and
  wherein the configurable function of modify comprises a set of rewrite capabilities to generate new headers of blocks of data that will be sent out of the data plane processing module.

11. The computer program product of claim 7, wherein the data plane container orchestrates an execution order of the first set of customized data processing modules and the second set of customized data processing modules by connecting the individual customized data processing modules according to a configuration policy.

12. The computer program product of claim 7, wherein the customized data processing module is composed of multiple instances through an abstraction of the data plane.

* * * * *